(12) United States Patent
Ovadia (10) Patent No.: US 6,546,557 B1
(45) Date of Patent: Apr. 8, 2003

(54) METHOD AND SYSTEM FOR ENHANCING DIGITAL VIDEO TRANSMISSION TO A SET-TOP BOX

(75) Inventor: Shlomo Ovadia, Yardley, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/170,852

(22) Filed: Oct. 13, 1998

(51) Int. Cl.[7] ................................................ H04N 7/173
(52) U.S. Cl. ...................... 725/129; 725/107; 725/119; 725/124; 725/131; 348/192
(58) Field of Search ................................ 725/119, 122, 725/124, 125, 131, 139, 151, 107, 129; 348/192, 193; 375/261, 264

(56) References Cited

U.S. PATENT DOCUMENTS

| | | | | |
|---|---|---|---|---|
| 5,812,294 A | * | 9/1998 | Wilson | |
| 5,841,563 A | * | 11/1998 | Effenberger | |
| 5,896,216 A | * | 4/1999 | Kikushima et al. | |
| 5,966,412 A | * | 10/1999 | Ramaswamy | |
| 5,987,069 A | * | 11/1999 | Furukawa et al. | |
| 6,160,572 A | * | 12/2000 | Matsuura | |
| 6,219,088 B1 | * | 4/2001 | Liu et al. | |
| 6,327,709 B1 | * | 12/2001 | Ovadia et al. | |

* cited by examiner

Primary Examiner—Andrew Faile
Assistant Examiner—Kieu-Oanh Bui
(74) Attorney, Agent, or Firm—Mayer Fortkort & Williams, PC; Karin L. Williams, Esq.

(57) ABSTRACT

A method and system for enhancing digital video transmission to set-top boxes improves the performance of a hybrid analog and digital video transmission system, for example, an AM-VSB QAM video transmission system, by selecting a digital channel map based on the relative magnitude and frequency locations of CSO and CTB distortions and the analog channel frequency plan. A variable interleaver may also be implemented in the video transmission system to further reduce the CSO and CTB distortions.

32 Claims, 5 Drawing Sheets

METHOD AND SYSTEM FOR ENHANCING DIGITAL VIDEO TRANSMISSION TO A SET-TOP BOX

BACKGROUND OF THE INVENTION

The present invention relates generally to a method and system for enhancing digital video transmission to set-top boxes in the presence of burst noise and, more particularly, to a method for enhancing the performance of multichannel systems providing analog and digital programming to subscribers, and most particularly, to a method for enhancing the performance of multichannel AM-VSB (amplitude modulated vestigial sideband)/QAM (quadrature amplitude modulation) video transmission system.

Video signals sent to set-top boxes of cable TV networks are often subject to "burst/impulse noise", originating from peak Composite-Second-Order (CSO)/Composite-Triple-Beat (CTB) distortions (CSO/CTB) and/or electrical interference, leading to both video "blocking" and visually degraded areas in the video picture. Recently, there have been many studies on the performance of 64/256-QAM channels (as known to those skilled in the art, "quadrature amplitude modulation" is a system which greatly increases the amount of information which can be carried within a given bandwidth; the technique is essentially a combination of phase and amplitude modulation, where, for example, 64-QAM has 8 amplitude states and 8 phase states) in the presence of nonlinear distortions in hybrid analog/digital (e.g., AM/QAM) video transmission systems. Most of these studies have analyzed the effect of clipping distortion on the bit-error-rate (BER) of a QAM channel using CW carriers from a multitone generator. However, a method of eliminating the negative effect of bursty CSO and CTB distortions, on the bit-error-rate (BER) of the QAM channel using modulated video carriers, has not been determined.

In fact, the problems associated with burst noise generated errors have been addressed only by using a convolutional interleaver as part of the error-correction scheme in a quadrature amplitude modulation (QAM) modem or receiver. In particular, a convolutional interleaver may be inserted between the channel encoder and the channel and is typically characterized by the number of shift registers, which is also called the "depth" I (symbols), and by the symbol delay increment per register J. Due to memory cost and end-to-end delay for the transmitted symbols, in certain applications it is advantageous to limit the interleaver (I, J) values.

More specifically, robust transmission of 64/256-QAM channels over current hybrid fiber/coax cable TV networks is achieved with the use of a forward-error-correction (FEC) scheme in the QAM modem or receiver. For some digital video broadcast (DVB) applications, the FEC scheme consists of a FEC code, such as Reed-Solomon (R-S) T=8 (204,188) code, a convolutional interleaver, and a randomizer. Interleaving the R-S symbols before transmission, and deinterleaving after reception, evenly disperses the burst errors in time, thus enabling the burst errors to be corrected by the FEC in the QAM modem or receiver as if the errors were randomly distributed.

As described in greater detail in the article entitled "Realization of Optimum Interleavers", by John L. Ramsey (Ramsey, J. L., ""Realization of Optimum Interleavers", IEEE Trans. Inf. Theory, IT16, 338–345 (1970)), an interleaver redistributes the channel symbols such that the symbols from a codeword are mutually separated by somewhat more than the length of a typical burst of errors, thus effectively making the channel appear to the decoder as a random-error channel. Ramsey further describes four realizations of interleavers that reorder a sequence of symbols such that no contiguous sequence of $n_2$ symbols in the reordered sequence, contains any pair of symbols that were separated by fewer than $n_1$ symbols in the original ordering.

Although the R-S code in the QAM modem cannot correct generated CSO/CTB burst errors without an interleaver, implementation using a larger interleaver in the modem or receiver, to address the problems associated with burst noise-generated errors, greatly increases the cost and thus, by itself, may not provide the optimal solution.

SUMMARY OF THE INVENTION

The present invention is therefore directed to the problem of reducing the effect of CSO/CTB distortions and burst/impulse noise on a transmitted digital signals, such as a QAM channel over a cable TV network.

In a preferred embodiment of the invention, a method to improve the performance of a hybrid analog and digital video transmission system selects a digital channel map based on the relative magnitude and frequency locations of nonlinear distortions and the analog channel frequency plan.

In a particular embodiment of the invention, the hybrid analog and digital is a multichannel AM-VSB/QAM video transmission system. And the digital channel map is selected based on the relative magnitude and frequency locations of CSO and CTB distortions and based on the analog channel frequency plan. In one particular embodiment, the relative magnitude and frequency locations of CSO and CTB distortions are determined based on a type of laser transmitter in the video lightwave transmission system, which can be either a Directly Modulated (DM) laser transmitter or an Externally Modulated (EM) laser transmitter.

In yet a further embodiment, the digital channel map selected downshifts each QAM channel center frequency to reduce the CSO and CTB distortions. In yet a further embodiment, the selected digital channel map is downloaded to the set-top box.

In another aspect of the invention, the determination of analog frequency plan indicates a harmonic related carrier (HRC) channel frequency plan or an interval related carrier (IRC) channel frequency plan. If the HRC plan is indicated, in accordance with one embodiment, the digital channel map selected downshifts each QAM channel center frequency by 3-MHz relative to the picture carrier frequency. If the IRC plan is implemented, again in accordance with one embodiment, when the CSO distortions are dominant, the digital channel map selected downshifts each QAM channel center frequency by 1.75-MHz relative to the picture carrier frequency; while when the CTB distortions are dominant, the digital channel map selected downshifts each QAM channel center frequency by 3-MHz relative to the picture carrier frequency.

In yet a further embodiment of the invention, a QAM modem in the video transmission system includes an interleaver, which may be variable, and the depth of the variable interleaver may be adjusted based on the CSO and CTB distortions.

In still a further embodiment of the invention, the headend of a hybrid analog and digital video transmission system, for enhancing digital video transmission, includes generating means, for generating a composite analog, digital and/or data signal, and transferring means, for transferring the generated signal. In the system, the transferring means determines the relative magnitude and frequency locations of nonlinear distortions, identifies the analog channel frequency plan, and selects a digital channel map based on the determination and identification.

DETAILED DESCRIPTION

Various braodband network architectures may be used to deliver analog/digital video, analog/digital audio, and high speed data to cable subcribers. The network architectures primarily implemented in the United States are the "Hybrid Fiber/Coax (HFC)" network, the "Fiber To The Curb (FTTC)" network and the "Fiber To The Home (FTTH)" network.

Figure 1A:
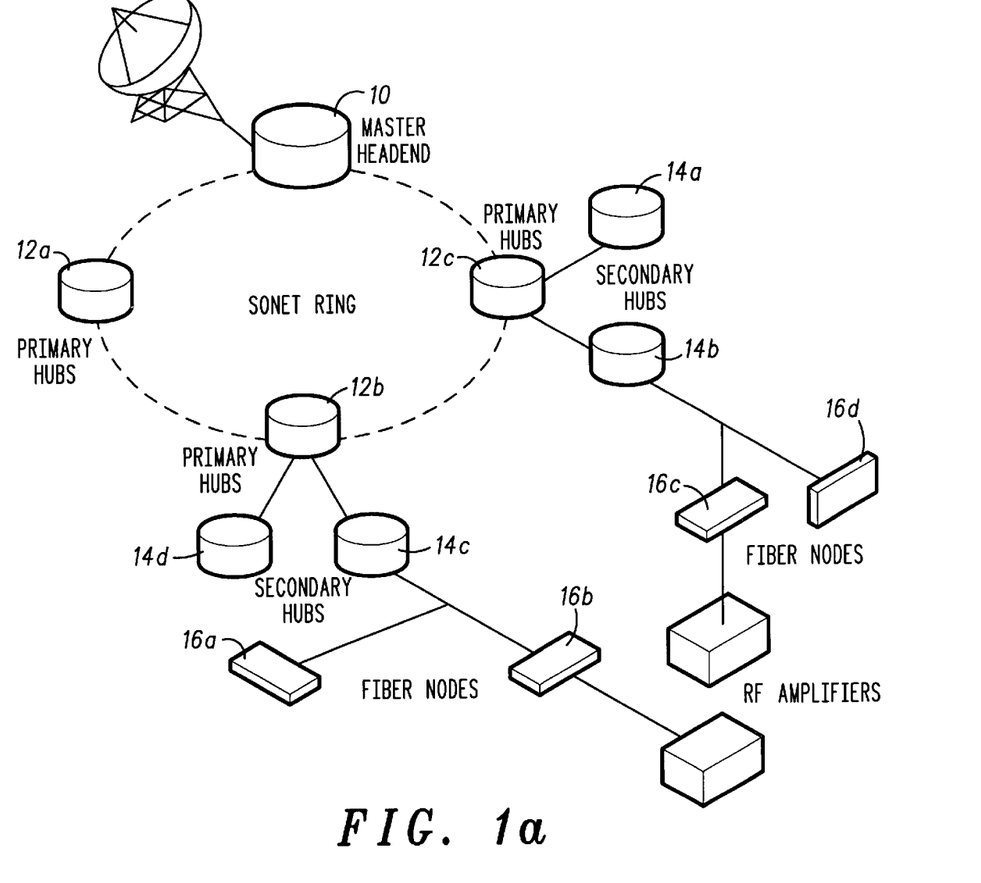
FIG. 1(a) shows the architecture of a conventional Hybrid Fiber/Coax (HFC) cable system.

The conventional HFC architecture is illustrated in FIG. 1(a). As shown, the signals from the master headend 10 to the primary (12a, 12b and 12c) and the secondary (14a, 14b, 14c and 14d) hubs are transmitted over single-mode fiber (SMF) using, for example, 1550-nm externally modulated (EM) DFB laser transmitters. The composite signal may be, for example, a mixture of traditional broadcast analog signals with MPEG compressed digital video. At the primary and secondary hubs, which may house Synchronous Optical Network (SONET) equipment as well as modems, routers, and servers for high-speed data, the optical signals may be converted to RF signals and then back to optical signals for transmission to various fiber nodes (16a, 16b, 16c and 16d) using, for example, 1310-mn DFB laser transmitters.

The coaxial portion of the network architecture illustrated in FIG. 1(a), consists of for example, RF amplifiers, taps, and coaxial cables, and spans from each fiber node (16a–d) to the corresponding subscriber's home(s), where the digital set-top box is placed.

Figure 1B:
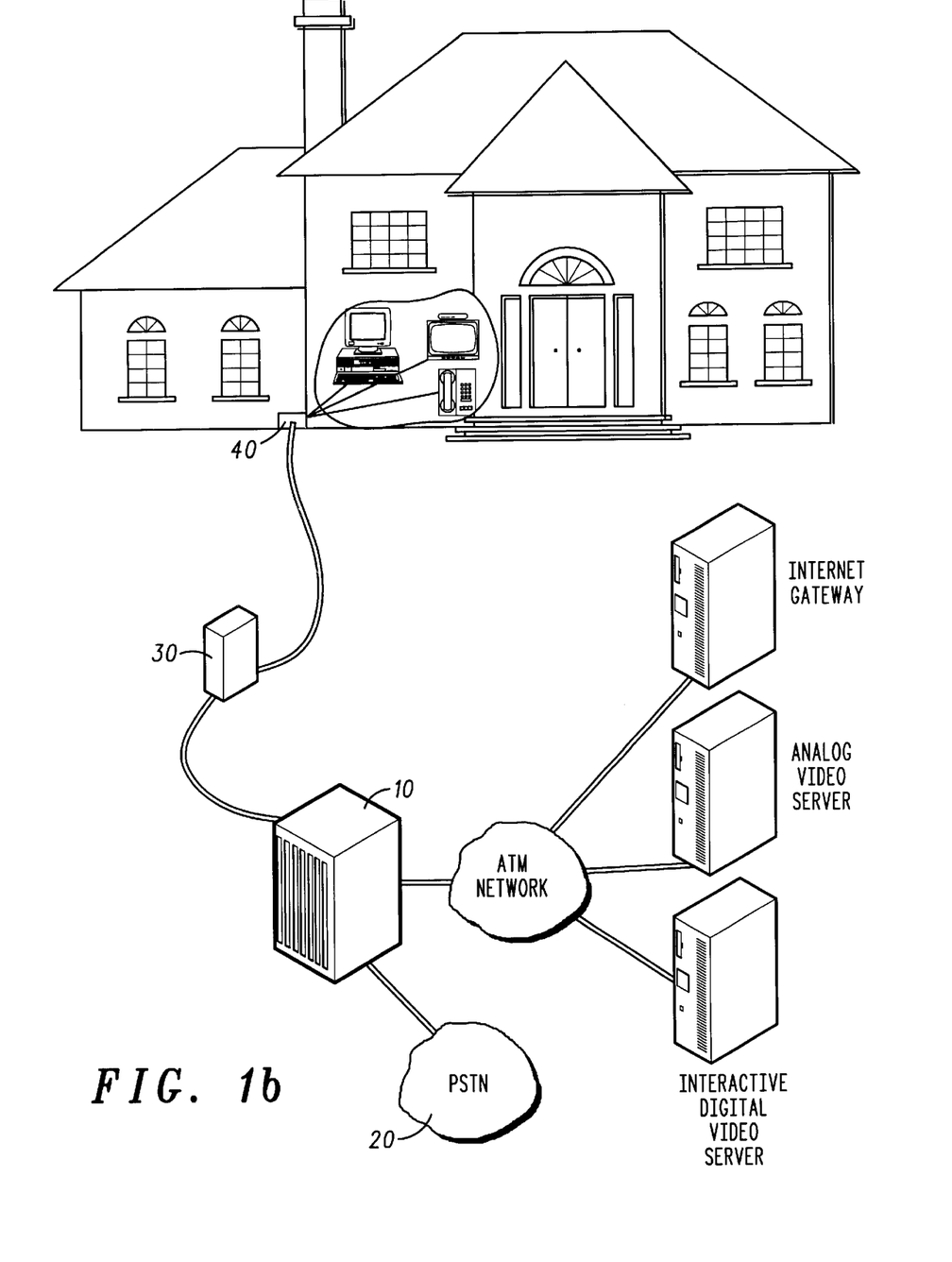
FIG. 1(b) shows the architure of a conventional Fiber To The Curb (FTTC) cable system.

FIG. 1(b) illustrates a conventional architecture for a Fiber-To-The-Curb (FTTC) Network. In this network, broadcasted analog video signals, interactive digital video signals, and high-speed data are transmitted over single-mode fiber (SMF) network to a switched digital access system 10, which may be located at a central office (CO) of a telephone company or a headend of a cable TV company. The switched access system may be also connected to public switched telephone network 20, as shown in FIG. 1(b). The combined signal, which consists of video, data, and telephony signals, is then transmitted via a SMF to a Broadband Network Interface 30 unit (BNI), which is typically located, for example, in the vicinity of a small serving area (20–50 homes). The BNI may be connected to the Broadband Gateway Interface 40 unit (BGI) at the side of the home via coaxial cable or twisted cooper wire. The BGI unit distributes the video, telephony, and data signals to the appropriate information devices as shown in FIG. 1(b). In the Fiber-To-The-Home (FTTH) architecture, although not specifically illustrated in FIG. 1, the BGI is simply replaced with the BNI; and thus the fiber continues to the home rather than "the curb".

While each of the above described architectures vary considerably, the inventive concepts described herein are applicable to any of the multiple cable system architectures, including the HFC system, the FTTC system, and the FTTH system, described above.

For illustrative purposes, an AM-VSB/256-QAM video transmission system will specifically be described and discussed. However, one skilled in the art will recognize the specific embodiments described herein are illustrative preferred embodiments, and that, for example, the "QAM" system could in fact be any known modulation system, including QPSK for example.

In accordance with a preferred embodiment of the present invention, the effect of burst/impulse noise on a QAM channel is significantly reduced by carefully selecting the QAM channel frequency plan based on the relative magnitude and frequency locations of the CSO and CTB distortions and on the analog channel frequency plan utilized by the system.

First, the relative magnitude of the CSO distortions as compared with the CTB distortions can be determined by the particular type of laser transmitter and receiver used by the cable operators. Specifically, the relative magnitude of the distortions depends on whether the laser transmitter is Directly Modulated (DM) or Externally Modulated (EM) and the type of pre-distortion circuitry. For downstream transmission, three types of laser transmitters are typically used: (1) a 1310-nm DM-DFB laser transmitter, (2) a 1550-nm EM-DFB laser transmitter, and (3) a 1319-nm EM YAG laser transmitter. The CSO distortions are typically the dominant distortions in the QAM channel when using a 1310-nm DM-DFB laser transmitter. However, the CTB distortions are typically the dominant distortions when using a 1550-nm EM-DFB laser transmitter. In order to reduce equipment cost, cable operators are likely to use either a 1310-nm DM-DFB laser transmitter or a 1550-nm EM-DFB laser transmitter over a given local network from a single vendor. Thus, a determination of which distortions, i.e., the CSO or CTB distortions, are dominant in the QAM channels may be made based on the type of laser transmitter.

In addition, in accordance with a preferred embodiment of the invention, the type of cable TV frequency plan utilized must be determined. The two most widely used cable TV frequency plans are the HRC, harmonically related carrier plan, and the IRC, incrementally related carrier plan. In the HRC frequency plan, the picture carrier frequencies in the different cable channels are forced to have a strictly proportional and phase-locked relationship, thereby concentrating the distortions at the carrier frequencies. In the HRC system the picture carrier frequencies are downshifted 1.25-MHz, compared with the corresponding picture carriers in the IRC plan. One advantage of the HRC plan is that the CSO and CTB distortion products fall on the picture carrier frequencies, and thus, their affect is less disturbing and if fact, becomes almost invisible. However, some converters and TV sets are incompatible and cannot detune to the new carrier frequencies.

In the IRC plan, the first picture carrier frequency is located at 55.2625-MHz with successive picture carriers located at 6-MHz apart, up to 1-GHz. The IRC plan eliminates the detuning problem, however, the CSO distortions are located at ±1.25-MHz from the corresponding picture carrier frequency, and thus can become visible.

If the IRC plan is used, and the dominant distorions are the CSO distortions, each QAM channel center frequency will be downshifted by 1.75-MHz relative to the picture carrier frequency. If however, the dominant distorions are the CTB distortions, each QAM channel center frequency will be downshifted by 3-MHz relative to the picture carrier frequency.

If the HRC plan is used, each QAM channel center frequency will be downshifted by 3-MHz relative to the picture carrier frequency regardless of whether the dominant distortions are the CSO or CTB distortions.

In one particular method of providing an offset to the QAM carrier frequency, implemented by the assignee General Instrument, a full frequency plan table is constructed from one or more Carrier Definition Table (CDT) structures, each defining a starting frequency, number of carriers, and frequency spacing for carriers in the group. The specified carrier represents the nominal band for all modulation methods including AM and QAM. The CDT and a Virtual Channel Table (VCT) are broadcasted from the headend, to the set-top box at the subscriber, through an Out-Of-Band (OOB) channel. The VCT informs the set-top box if the tuned channel is MPEG-2, the type of modulation mode (QAM or AM), the full frequency plan using the CDT, and other parameters.

As noted above, the bursty behaviors of the CSO distortions, which are produced by the modulated analog video signals at the directly modulated laser transmitter (e.g., 1310-nm DM-DFB), are responsible for the Bit-Error-Rate (BER) degradation of the 256-QAM channel. However, as described in further detail below, in addition to offsetting the frequency of the QAM channel relative to the dominant distortions, in a preferred embodiment of the invention, the interleaver depth in a QAM modem may also be adjusted so as to combat burst-errors generated by time-varying CSO distortions in a hybrid multichannel AM-VSB (amplitude modulated vestigial-sideband)/256-QAM video lightwave transmission system. In particular, in the experimental simulation setup described below, when an I=204, J=1 interleaver was used together with QAM channel frequency offset with respect to the dominant CSO distortions, the 256-QAM coded bit-error-rate BER was reduced by more than 500 times as compared with the case where QAM frequency offset was implemented but no interleaver was utilized, even in the presence of large CSO distortion levels (>−60-dBc).

Finally, an additional aspect of the invention further reduces the CSO/CTB distortions to the cable plant by providing a switch, outside the AGC circuitry, which lowers the operating point by 3.0–3.4-dB by switching between continuous wave (CW) carriers and analog video signals. In particular, in the proposed method, the AM CNR and CSO/CTB distortions are measured with modulated AM-VSB video signals and 0-dBm optical power at the fiber node receiver. The average RF input level to the laser transmitter, outside the AGC circuitry, is then reduced by approximately 3.4-dB and the AM CNR and CSO/CTB distortions are once again measured. The results then represent an "optimum" operating point for the laser transmitter when using modulated video signals.

Figure 2A:
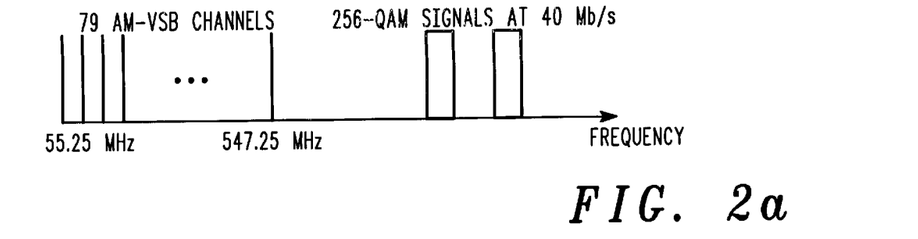
FIG. 2(a) shows the channel plan implemented for an experimental simulation.
Figure 2B:
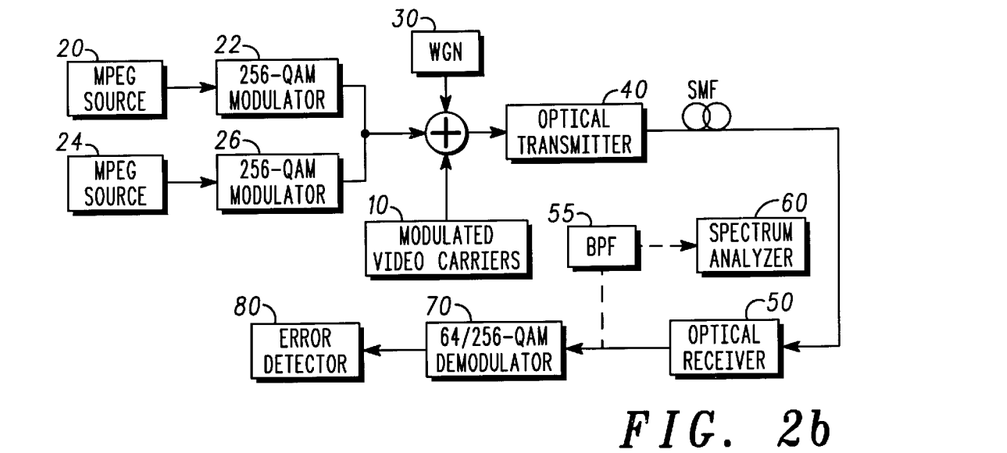
FIG. 2(b) illustrates an experimental simulation hybrid multichannel AM-VSB/256 QAM video transmission system used to test the principles of the present invention.

FIG. 2(b) provides an experimental simulation setup, of a hybrid multichannel AM-VSB/256-QAM video lightwave transmission system, that was used to test the proposed method. As shown in the channel plan of FIG. 2(a), the channel plan for the simulated system consisted of seventy-nine AM-VSB (amplitude modulated vestigial sideband) broadcast TV video channels 10, from a cable TV headend, which were combined with two 256-QAM digital channels (MPEG sources 20 and 24, and QAM modulators 22 and 26), operating at 40.5 Mb/s (for compressed digital video and high speed data services) at a RF frequency of 571.25-MHz and 643.25-MHz, to directly-modulate a 1310-nm DFB laser transmitter 40. Once again it is noted that the channel plan shown in FIG. 2(a) was used for a simulation and is exemplary only and could in fact consist of any analog and/or digital requirements including digital audio.

A broadband white Gaussian noise source 30 was also used in the QAM link for BER-SNR measurements. After transmission through 10.6-km of a standard single-mode-fiber, the combined signal was detected at 0-dBm received optical power at the cable TV receiver 50. The CNR, CTB and CSO of the AM band were measured on a spectrum analyzer 60. The 256-QAM signals were down-converted to IF frequency, demodulated by 64/256-QAM demodulator 70, and then fed to an error-detector 80. The peak modulated video power to the average QAM channel power ratio was 5.6 dB.

The measured AM-VSB CNR at the cable TV receiver was 51.8 dB with an average CSO distortion of −56.8-dBc and CTB distortion of −60-dBc in the 256-QAM band. As expected, the CSO distortion at 572.5-MHz was the dominant non-linear distortion in the QAM channel band. The 1310-nm DFB laser transmitter was operating at AM modulation index of 3.5% per channel with a clipping index $\gamma = 4 \cdot 10^{-4}$.

Figure 3:
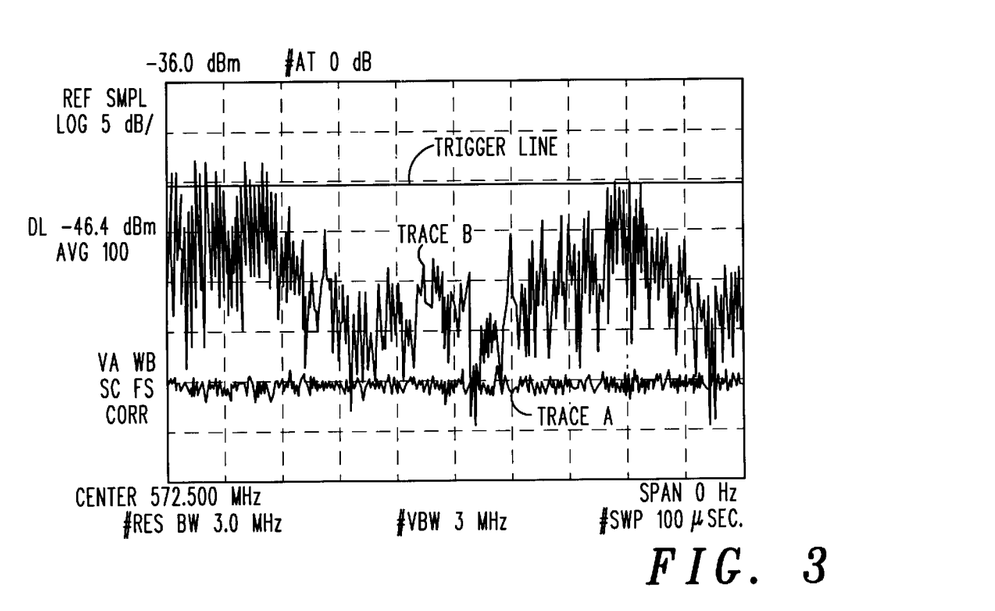
FIG. 3 shows traces of the average (trace A) and the peak (trace B) CSO distortions at 572.5-MHz from the experimental simulation setup of FIG. 2.

FIG. 3 shows typical 100-μs time-traces of the average (trace A) and the peak (trace B) CSO distortion at 572.5-MHz on a spectrum analyzer (SA) in a zero span mode. The SA trigger was setup to start the sweep for any event of the peak CSO distortion, which is above the solid line. The line represents the threshold level for impulses with higher amplitudes that would degrade the coded BER.

The observed bursty behavior of the CSO distortion, which has a non-Gaussian statistics, can be explained by the fact that the peak envelope power of modulated video signals (unlike CW carriers) can vary by as much as 18-dB, depending on the picture content. Specifically, the synchronization pulses of the modulated video signals may temporarily align with each other, causing the corresponding video carriers to be at their maximum power at the same time, resulting in increased CSO/CTB distortions. Thus, the use of CW carriers to simulate modulated video carriers does not accurately represent the time-dependence of the peak CSO/CTB distortions.

In addition, the use of CW carriers from a multitone generator to simulate modulated video carriers also affects the laser clipping distortion. In particular, the Automatic Gain Control (AGC) circuitry in the directly modulated (DM) DFB laser transmitter maintains the average RF input power at a fixed level. Under these conditions, when CW carriers are used, the AGC circuitry reduces the AM modulation index by a factor of $\sqrt{\beta}$, and the CNR is lowered by a factor of $\beta$ (approximately 3.4-dB), as compared with using modulated video carriers, resulting in reduced CSO/CTB distortions.

In order to combat the generated burst errors, a variable interleaver in the QAM modem, with depth I up to 204 symbols, and J=204/I symbols, was used with R-S T=8 (204,188) code. The maximum burst length that can be corrected by the variable interleaver and deinterleaver combination is given by:

$$\tau = \frac{(J \cdot I \cdot + 1) \cdot T}{R_S} \cdot \left[\frac{I}{N}\right], \quad \text{Eq. (1)}$$

where I and J are the interleaver parameters, N=204 symbols is the R-S block size, $R_s$=5.056 Mbaud is the transmitted symbol rate, and T=8 symbols.

Figure 4:
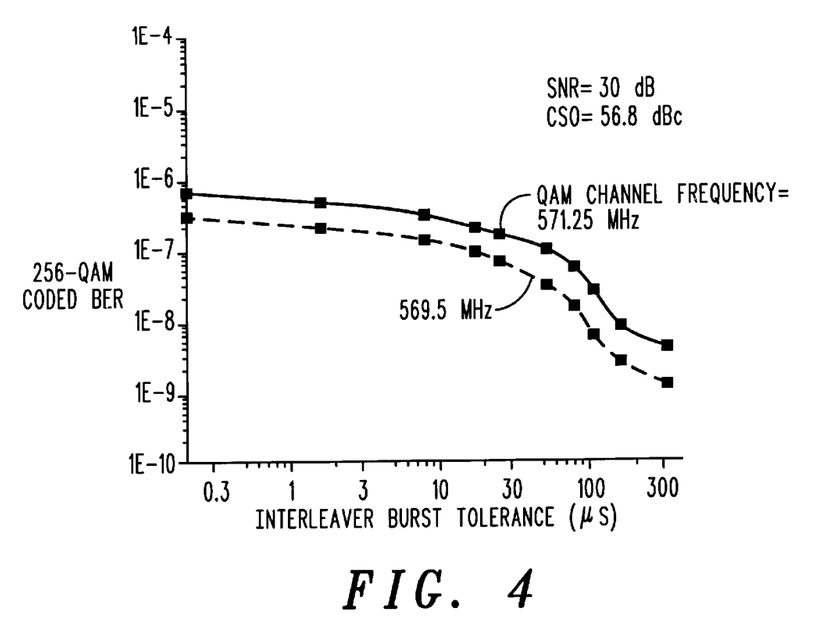
FIG. 4 illustrates the measured BER versus the maximum interleaver burst tolerance, with and without QAM channel frequency offset from the experimental simulation setup of FIG. 2.

FIG. 4 shows the measured 256-QAM coded BER versus the maximum interleaver burst tolerance $\tau$ ($\mu$s) for QAM channel center frequencies of 571.25-MHz (solid line) and 569.5-MHz (dotted line). The 256-QAM SNR was set to 30-dB, corresponding to a coded BER of $1.5 \cdot 10^{-9}$ with no AM-VSB channel loading (CSO=−56.8 dBc). Since the interleaver was used with I·J=204 symbols, increasing I according to the above equation results in increasing the burst tolerance as shown in FIG. 4. For an I=204, J=1 interleaver, a nearly four times reduction in the 256-QAM BER was obtained by the QAM channel frequency offset alone.

As illustrated in FIG. 4, at a burst duration of 30-$\mu$s, the 256-QAM coded BER slowly decreases as the interleaver depth is increased since the average burst length is larger than the maximum burst tolerance of the interleaver and deinterleaver combination. However, as the maximum interleaver burst tolerance becomes significantly larger than a burst duration of about 30-$\mu$s ($\approx$3X), most of the generated burst errors are effectively corrected by the interleaver, resulting in a steeper reduction in the coded BER. In fact, the 256-QAM coded BER was reduced by two orders of magnitude in comparison to the "BER without implementation of an interleaver" case.

The results illustrated in FIG. 4 also indicate that using an I=68, J=3 interleaver with QAM channel frequency offset will provide the same coded BER as a three times longer interleaver (I=204, J=1) without QAM channel frequency offset. From implementation cost point of view, it can be significantly less expensive to keep the depth and the symbol delay (I, J) of the convolutional interleaver as short as possible, as it requires the addition of Static Random Access Memory (SRAM) in the QAM receiver.

Figure 5:
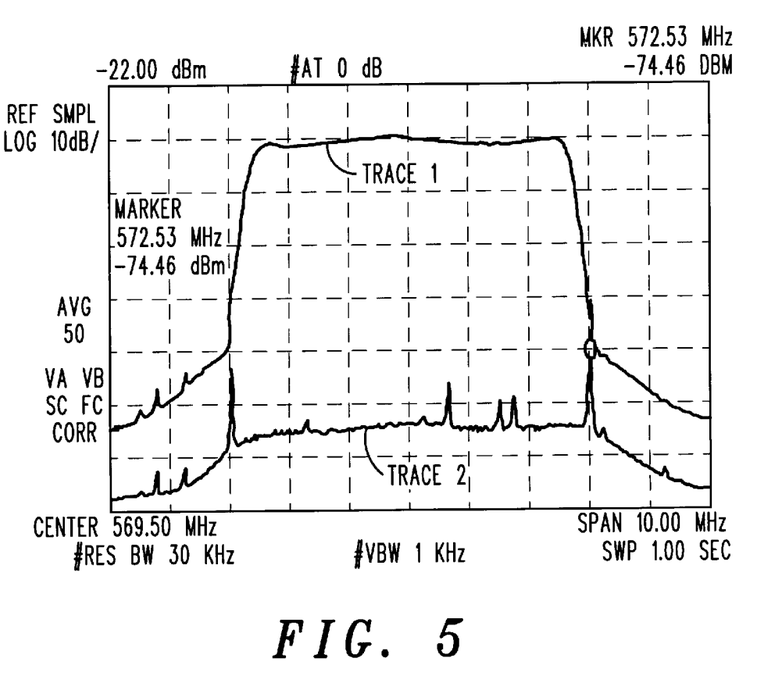
FIG. 5 shows the RF frequency spectrum, with a bandpass filter and without a bandpass filter, where the dominant CSO distortions are outside the shifted 569.5-MHz 256-QAM channel band, illustrating the principles of the present invention.

In addition, by shifting the QAM channel center frequency down to 569.5-MHz, FIG. 5 shows that the dominant CSO distortions at 572.5-MHz and at 566.5-MHz (trace 2) are now located outside the downshifted QAM channel band. The other nonlinear distortions in the downshifted QAM band, namely, the CSO distortion at 570-MHz and the CTB distortion at 571.25-MHz, have smaller magnitudes relative to the QAM carrier. If the CTB distortion becomes the dominant distortion in the QAM band, then a 3-MHz downshift of the QAM channel frequency to 568.25-MHz is required to improve the 256-QAM coded BER.

Those skilled in the art will appreciate that the proposed fixed QAM channel frequency offset method can also be applied to multiple contiguous digital (e.g., QAM) channels, where the dominant non-linear (e.g., CSO or CTB) distortions will fall in, the small gaps between the digital channels.

Figure 6:
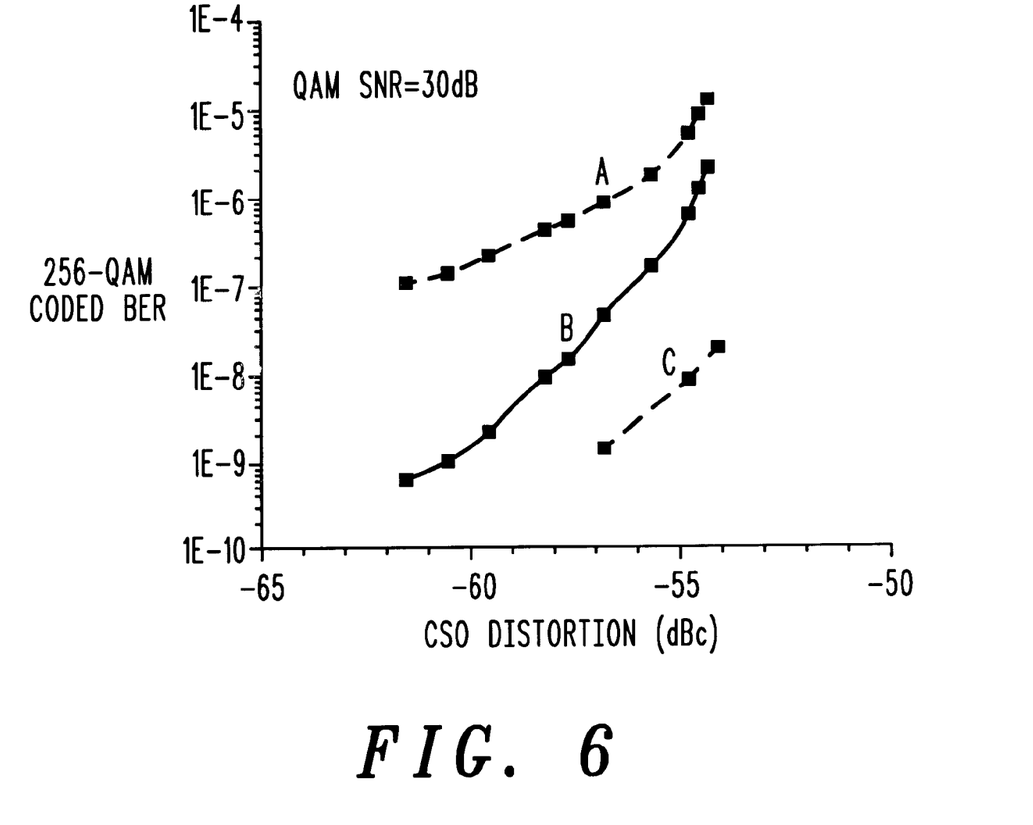
FIG. 6 illustrates the measured 256-QAM Coded BER versus the average CSO distortion for (A) no interleaver; (B) I=68, J=3 interleaver and (C) I=204, J=1 interleaver, each with the QAM channel center frequency downshifted 3-MHz, in accordance with the principles of the present invention, to 569.5-MHz.

Finally, FIG. 6 provides an illustration which indicates that an I=204, J=1 interleaver in a QAM receiver will also work as well at higher CSO distortion levels. To obtain the measurements illustrated in FIG. 6, the AM modulation index per channel at the laser transmitter was changed while keeping the power ratio between the QAM and the AM-VSB channels constant. Specifically, FIG. 6 shows the measured 256-QAM coded BER, with the QAM channel at 571.25-MHz, versus the average CSO distortion at a frequency of 572.5-MHz for (A) no interleaver, (B) I=68, J=3 interleaver, and (C) downshifted QAM channel to 569.5-MHz with 30 dB SNR and I=204, J=1 interleaver. The I=68, J=3 interleaver (trace B) works best at CSO distortion levels less than −60-dBc. At higher CSO distortion levels however, the I=68, J=3 interleaver is overwhelmed with burst errors, resulting in a BER performance that approaches the no interleaver case. As illustrated by trace C, the I=204, J=1 interleaver, together with the QAM channel frequency offset method, provides robust transmission, even in the presence of large CSO distortions ($\geq$−55 dBc).

As is clearly shown, by frequency offsetting a QAM channel relative to the dominant bursty CSO distortions, and implementing a variable interleaver (i.e., in this case, an I=204 J=1 interleaver), nearly error-free transmission was achieved, even in the presence of large CSO distortions (>−55-dBc) in a hybrid AM-VSB/256-QAM video lightwave transmission system. Accordingly, based on (1) the magnitude and frequency locations of the CSO and CTB distortions in the cable TV network and on (2) the analog channel frequency plan, the selection of the proper interleaver depth as well as the proper shifting of QAM channel frequency plan may be made.

Applicant notes that while the detailed description of the invention corresponding to FIGS. 2–6 is related only to a preferred embodiment of a multichannel AM-VSB/256 QAM video lightwave transmission system, several different transmission systems are used internationally, and the inventive concepts described herein are equally applicable to all hybrid analog/digital video transmission systems.

In addition, it will be appreciated that modifications and variations of the present invention are covered by the above teachings and within the purview of the appended claims without departing from the spirit and intended scope of the invention.

What is claimed is:

1. A method to improve the performance of hybrid analog and digital video transmission systems comprising the step of:
   determining the relative magnitude and frequency locations of nonlinear distortions;
   identifying an analog channel frequency plan used in said transmission system; and
   selecting a digital channel map based on said determining step and said identifying step,
   wherein a frequency band of a first digital channel is selected in said selecting step such that dominant linear distortions fall outside said frequency band.

2. A method in accordance with claim 1, wherein the method is applied to multiple contiguous digital channels, and wherein the nonlinear distortions fall in gaps between the multiple contiguous digital channels.

3. A method in accordance with claim 1, further comprising the step of downloading the selected digital channel map to the set-top box.

4. A method in accordance with claim 1, wherein the digital channel map selected in said selecting step downshifts each channel center frequency to reduce the nonlinear distortions.

5. A method in accordance with claim 1, wherein the hybrid analog and digital video transmission system is a multichannel AM-VSB/QAM system.

6. A method in accordance with claim 5, wherein the nonlinear distortions determined in said determining step are CSO and CTB distortions.

7. A method in accordance with claim 6, wherein the digital channel map selected in said selecting step downshifts each QAM channel center frequency to reduce the magnitude of the CSO and CTB distortions.

8. A method in accordance with claim 6, wherein said determining step determines the relative magnitude and frequency locations of CSO and CTB distortions based on a type of laser transmitter in the video transmission system.

9. A method in accordance with claim 8, wherein the laser transmitter of the video transmission system is a Directly Modulated (DM) laser transmitter.

10. A method in accordance with claim 8, wherein the laser transmitter of the video transmission system is an Externally Modulated (EM) laser transmitter.

11. A method according to claim 5, wherein a QAM modem in said video transmission system includes an interleaver.

12. A method according to claim 11, wherein the depth of the interleaver is variable.

13. A method according to claim 12, wherein the depth of the interleaver may be adjusted based on the CSO and CTB distortions determined in said determining step.

14. A method according to claim 12, wherein increasing the depth of the interleaver reduces the magnitude of the CSO and CTB distortions.

15. A method in accordance with claim 1, wherein said identifying step identifies a harmonic related carrier (HRC) channel frequency plan.

16. A method in accordance with claim 15, wherein the digital channel map selected downshifts each QAM channel center frequency by 3-MHz relative to the picture carrier frequency.

17. A method in accordance with claim 1, wherein said identifying step identifies an interval related carrier (IRC) channel frequency plan.

18. A method in accordance with claim 17, wherein when said determining step determines that the CSO distortions are dominant, the digital channel map selected downshifts each QAM channel center frequency by 1.75-MHz relative to the picture carrier frequency.

19. A method in accordance with claim 17, wherein when said determining step determines that the CTB distortions are dominant, the digital channel map selected downshifts each QAM channel center frequency by 3-MHz relative to the picture carrier frequency.

20. A method according to claim 1, wherein continuous wave (CW) carriers are used to simulate modulated video carriers.

21. A method according to claim 20, wherein Automatic Gain Circuitry (AGC) maintains an average RF input power at a fixed level.

22. A method according to claim 21, wherein a laser transmitter of the video lightwave transmission system is a Directly Modulated (DM) laser transmitter.

23. A method according to claim 21, wherein a laser transmitter of the video lightwave transmission system is an Externally Modulated (EM) laser transmitter.

24. A method according to claim 21, further comprising the steps of:
   a first measuring step for measuring AM CNR and CSO/CTB distortions a first time with modulated video carriers and 0-dBm optical power;
   reducing the average RF input level to the laser transmitter; and
   a second measuring step for measuring AM CNR and CSO/CTB distortions a second time.

25. A method according to claim 24, wherein an optimum operating point of the laser transmitter for modulated signals is obtained by said second measuring step.

26. A method in accordance with claim 1, further wherein a frequency location of the first digital channel is located above a last analog channel frequency.

27. A method to improve the performance of a multichannel AM-VSB/QAM video lightwave transmission system comprising the steps of:
   determining the relative magnitude and frequency locations of CSO and CTB distortions;
   identifying an analog channel frequency plan used in said transmission system;
   selecting a digital channel map based on said determining step and said identifying step, wherein a frequency band of a first digital channel is selected in said selecting step such that dominant linear distortions fall outside said frequency band; and
   adjusting the depth of a variable interleaver or said video lightwave transmission system to reduce the CSO and CTB distortions determined in said determining step.

28. A method in accordance with claim 27, wherein the digital channel map selected downshifts each QAM channel center frequency to reduce the magnitude of the CSO and CTB distortions.

29. A method in accordance with claim 27, wherein increasing the depth of the variable interleaver reduces the magnitude of the CSO and CTB distortions.

30. A method in accordance with claim 27, further wherein a frequency location of the first digital channel is located above a last analog channel frequency.

31. A hybrid analog and digital video transmission system for enhancing digital video transmission, the headend of the system comprising:
   means for generating a composite analog, digital and/or data signal; and
   means for transferring the generated signal,
      wherein said transferring means determines the relative magnitude and frequency locations of nonlinear distortions, and
      further wherein said transferring means identifies an analog channel frequency plan used in said transmission system, and
      still further wherein a digital channel map is selected based on the determination and identification made by said transferring means, wherein a frequency band of a first digital channel is selected such that dominant linear distortions fall outside said frequency band.

32. A method in accordance with claim 31, further wherein a frequency location of the first digital channel is located above a la,t analog channel frequency.

* * * * *

UNITED STATES PATENT AND TRADEMARK OFFICE
CERTIFICATE OF CORRECTION

PATENT NO. : 6,546,557 B1
DATED : April 8, 2003
INVENTOR(S) : Ovadia

It is certified that error appears in the above-identified patent and that said Letters Patent is hereby corrected as shown below:

Column 1,
Line 13, change "(amplitute" to -- (amplitude --.

Column 2,
Line 19, change "signals" to -- signal --.
Line 27, change "digital is a" to -- digital video transmission system is a --.

Column 3,
Lines 9-10, change "architure" to -- architecture --.
Line 37, change "braodband" to -- broadband --.

Column 4,
Line 12, change "cooper" to -- copper --.

Column 5,
Line 6, change "their affect is less disturbing and if" to -- their effect is less disturbing and in --.
Lines 16 and 19, change "distorions" to -- distortions --.
Line 61, change "(>-60-dBc)" to -- ($\geq$-60-dBc) --.

Column 7,
Line 6, change "3.4" to -- 3.0 – 3.4 --.
Line 43, change "reduced by two" to -- reduced by almost three --.

Column 8,
Line 3, change "fall in," to -- fall in --.
Line 23, change "($\leqq$-55 dBc)" to -- ($\geq$-55-dBc) --.
Line 29, change "(>-55-dBc)" to -- ($\geq$-55-dBc) --.
Line 50, change "step" to -- steps --.

UNITED STATES PATENT AND TRADEMARK OFFICE
CERTIFICATE OF CORRECTION

PATENT NO. : 6,546,557 B1
DATED : April 8, 2003
INVENTOR(S) : Ovadia

It is certified that error appears in the above-identified patent and that said Letters Patent is hereby corrected as shown below:

Column 10,
Line 30, change "interleaver or" to -- interleaver of --.
Line 65, change "la,t" to -- last --.

Signed and Sealed this

Twenty-seventh Day of July, 2004

JON W. DUDAS
*Acting Director of the United States Patent and Trademark Office*